(12) United States Patent
Bergerson et al.

(10) Patent No.: US 9,895,831 B2
(45) Date of Patent: Feb. 20, 2018

(54) COMPRESSION-MOLDED PARTS HAVING AN EMBEDDED CONDUCTIVE LAYER AND METHOD FOR MAKING SAME

(75) Inventors: Anthony P. Bergerson, Cedar Hill, TX (US); Jason L. Hoyle, Mansfield, TX (US)

(73) Assignee: Textron Innovations Inc., Providence, RI (US)

( * ) Notice: Subject to any disclaimer, the term of this patent is extended or adjusted under 35 U.S.C. 154(b) by 1690 days.

(21) Appl. No.: 11/660,772

(22) PCT Filed: May 23, 2005

(86) PCT No.: PCT/US2005/017916
§ 371 (c)(1),
(2), (4) Date: Feb. 21, 2007

(87) PCT Pub. No.: WO2006/025890
PCT Pub. Date: Mar. 9, 2006

(65) Prior Publication Data
US 2007/0257152 A1 Nov. 8, 2007

Related U.S. Application Data

(60) Provisional application No. 60/606,317, filed on Sep. 1, 2004.

(51) Int. Cl.
*B64C 1/00* (2006.01)
*B29C 43/00* (2006.01)
(Continued)

(52) U.S. Cl.
CPC ............ *B29C 43/003* (2013.01); *B29C 43/18* (2013.01); *B29C 70/885* (2013.01); *B32B 1/00* (2013.01);
(Continued)

(58) Field of Classification Search
CPC ... B29C 70/885; B29C 43/18; B29K 2705/00; B29K 2705/02; B29K 2705/10;
(Continued)

(56) References Cited

U.S. PATENT DOCUMENTS 3,755,713 A    8/1973   Paszkowski
4,402,779 A    9/1983   Levy
(Continued)

FOREIGN PATENT DOCUMENTS

CN    1047780 A    5/1990
EP    0399944 A2    11/1990
(Continued)

OTHER PUBLICATIONS

Plastics, http://en.wikipedia.org/wiki/Plastic, accessed May 27, 2014.*
(Continued)

*Primary Examiner* — Camie Thompson
(74) *Attorney, Agent, or Firm* — James E. Walton

(57) ABSTRACT

A compression-molded part has a conductive layer embedded in the part during molding of the part. The conductive layer is generally adjacent an outer surface of the part and is preferably formed from a mesh, a foil, a pulled screen, or multiple layers of conductive elements. The part is preferably optimized for use on the exterior of an aircraft for lightning-strike or EMI protection or for use as an antenna. Methods for forming the panels of the invention include placing the conductive layer against a mold surface of a compression mold, then forming the compression-molded part with the conductive layer embedded in the part.

7 Claims, 3 Drawing Sheets

(51) Int. Cl.
<table>
<tr><td>B29C 43/18</td><td>(2006.01)</td></tr>
<tr><td>B29C 70/88</td><td>(2006.01)</td></tr>
<tr><td>B32B 1/00</td><td>(2006.01)</td></tr>
<tr><td>B32B 3/02</td><td>(2006.01)</td></tr>
<tr><td>B32B 5/26</td><td>(2006.01)</td></tr>
<tr><td>B32B 7/02</td><td>(2006.01)</td></tr>
<tr><td>B32B 15/02</td><td>(2006.01)</td></tr>
<tr><td>B32B 15/06</td><td>(2006.01)</td></tr>
<tr><td>B32B 15/08</td><td>(2006.01)</td></tr>
<tr><td>B32B 15/20</td><td>(2006.01)</td></tr>
<tr><td>B32B 25/02</td><td>(2006.01)</td></tr>
<tr><td>B32B 27/18</td><td>(2006.01)</td></tr>
<tr><td>B29K 101/10</td><td>(2006.01)</td></tr>
<tr><td>B29K 105/06</td><td>(2006.01)</td></tr>
<tr><td>B29K 705/00</td><td>(2006.01)</td></tr>
<tr><td>B29K 705/02</td><td>(2006.01)</td></tr>
<tr><td>B29K 705/10</td><td>(2006.01)</td></tr>
<tr><td>B29L 31/30</td><td>(2006.01)</td></tr>
</table>

(52) U.S. Cl.
CPC ............... *B32B 3/02* (2013.01); *B32B 5/26* (2013.01); *B32B 7/02* (2013.01); *B32B 15/02* (2013.01); *B32B 15/06* (2013.01); *B32B 15/08* (2013.01); *B32B 15/20* (2013.01); *B32B 25/02* (2013.01); *B32B 27/18* (2013.01); *B29K 2101/10* (2013.01); *B29K 2105/06* (2013.01); *B29K 2705/00* (2013.01); *B29K 2705/02* (2013.01); *B29K 2705/10* (2013.01); *B29L 2031/3076* (2013.01); *B32B 2260/021* (2013.01); *B32B 2260/046* (2013.01); *B32B 2260/048* (2013.01); *B32B 2262/101* (2013.01); *B32B 2262/103* (2013.01); *B32B 2307/202* (2013.01); *B32B 2457/00* (2013.01); *B32B 2605/18* (2013.01); *Y02T 50/433* (2013.01)

(58) Field of Classification Search
CPC ............ B29K 2101/10; B29K 2101/06; B29K 2105/06; B29L 2031/3076; B32B 15/02; B32B 15/20; B32B 2301/202; B32B 25/02; B32B 1/00; B32B 15/08; B32B 2605/18; Y10T 442/164; Y10T 442/176; Y10T 442/198; Y10T 442/186; Y10T 442/339; Y10T 442/475
See application file for complete search history.

(56) References Cited

U.S. PATENT DOCUMENTS

<table>
<tr><td>4,647,495 A *</td><td>3/1987</td><td>Kanayama et al. ............ 442/60</td></tr>
<tr><td>H0000394 H *</td><td>12/1987</td><td>Cleaton ........................ 361/215</td></tr>
<tr><td>4,746,389 A *</td><td>5/1988</td><td>DiGenova ..................... 156/247</td></tr>
<tr><td>4,882,089 A *</td><td>11/1989</td><td>Iwaskow et al. ............. 442/229</td></tr>
<tr><td>5,127,601 A *</td><td>7/1992</td><td>Schroeder ..................... 244/1 A</td></tr>
<tr><td>5,314,309 A *</td><td>5/1994</td><td>Blakeley et al. ............. 416/226</td></tr>
<tr><td>5,352,565 A</td><td>10/1994</td><td>Schroeder</td></tr>
<tr><td>5,370,921 A</td><td>12/1994</td><td>Cedarleaf</td></tr>
<tr><td>5,384,185 A</td><td>1/1995</td><td>Bovenschen et al.</td></tr>
<tr><td>5,417,385 A</td><td>5/1995</td><td>Arnold et al.</td></tr>
<tr><td>5,499,782 A</td><td>3/1996</td><td>Domine</td></tr>
<tr><td>5,591,384 A *</td><td>1/1997</td><td>Abrams ................. B29B 11/10<br>264/142</td></tr>
<tr><td>5,817,736 A *</td><td>10/1998</td><td>von Gentzkow et al. .... 528/108</td></tr>
<tr><td>5,846,634 A</td><td>12/1998</td><td>Werth</td></tr>
<tr><td>5,865,397 A</td><td>2/1999</td><td>Herrmann</td></tr>
<tr><td>6,303,206 B1</td><td>10/2001</td><td>Brick</td></tr>
<tr><td>7,161,542 B2 *</td><td>1/2007</td><td>Endo et al. ................... 343/702</td></tr>
<tr><td>2004/0069895 A1</td><td>4/2004</td><td>Pham et al.</td></tr>
<tr><td>2004/0121674 A1</td><td>6/2004</td><td>Robbins</td></tr>
<tr><td>2008/0272518 A1*</td><td>11/2008</td><td>Steiner ................. B29C 43/021<br>264/323</td></tr>
</table>

FOREIGN PATENT DOCUMENTS

<table>
<tr><td>EP</td><td>0465399 A2</td><td>1/1992</td></tr>
<tr><td>JP</td><td>63293018 A</td><td>11/1988</td></tr>
<tr><td>WO</td><td>2005/056383 A2</td><td>6/2005</td></tr>
</table>

OTHER PUBLICATIONS

Merriam Webster online dictionary definition of a layer.*
CN Office Action, Jul. 10, 2009.
English Translation of CN Office Action, Jul. 10, 2009.
CA Office Action, Aug. 26, 2009.
Supplemental European Search Report dated Sep. 22, 2010 from European counterpart Application EP05819580.
European Office Action from counterpart EP Application No. 05819508.1 issued by the European Patent Office on Feb. 15, 2011.
Office Action by the Chinese Patent Office from counterpart Chinese Application No. 200580029399.5; Date Nov. 21, 2011.
European Office Action from counterpart EP Application No. 05819508.1 issued by the European Patent Office on Mar. 28, 2012.
Office Action by the European Patent Office from counterpart European Application No. 05819580.1-1308; dated Oct. 25, 2013.
Examination Report dated May 7, 2015 from counterpart EP App. No. 05819580.1.

* cited by examiner

COMPRESSION-MOLDED PARTS HAVING AN EMBEDDED CONDUCTIVE LAYER AND METHOD FOR MAKING SAME

CROSS REFERENCE TO RELATED APPLICATIONS

This application is a 371 of PCT Application No. PCT/US05/17916, filed on May 23, 2005 which claims benefit of U.S. Provisional Application No. 60/606,317, filed on Sep. 1, 2004.

GOVERNMENT LICENSE RIGHTS

The U.S. Government has a paid-up license in this invention and the right in limited circumstances to require the patent owner to license others on reasonable terms as provided for by the terms of Contract No. N00019-96-C-0128 awarded by NAVAIR.

TECHNICAL FIELD

The present invention relates generally to the field of molded parts and relates particularly to compression-molded parts having an embedded conductive layer.

DESCRIPTION OF THE PRIOR ART

Compression-molded parts are fabricated using a matched die set consisting of male and female dies. The molding material, which may be a powder, pellets, sheet, a putty-like mass, or a liquid, is introduced into the female die in a partially cured condition and may be preheated prior to being placed in the die. The mold is then closed with the male die member, pressure is applied to force the material into contact with all mold areas, and heat and pressure are maintained until the molding material has cured. The process employs thermosetting resins, and advanced composite thermoplastics may also be compression molded with unidirectional tapes, woven fabrics, randomly orientated fiber mat, or chopped strand. The advantage of compression molding is its ability to mold large, fairly intricate parts with very little labor cost.

Certain compression-molded external fairings and panels on aircraft require lightning strike protection. Prior art methods of providing lighting protection to compression-molded parts include: (1) secondary bonding of a copper mesh to the part via a structural adhesive layer; and (2) painting the compression-molded part with copper-filled paint. A key disadvantage of the secondary bonding process is the added weight of the adhesive. In addition, there is an increase in per-unit cost due to the inherent post-molding processing, the need for additional tooling, and any required rework or repair of surface imperfections. The copper-paint method has a high weight penalty and may provide inconsistent protection due to variations in application thickness. In addition, the copper paint can be easily damaged during routine maintenance and can be inadvertently removed during repair or repaint situations.

SUMMARY OF THE INVENTION

There is a need for compression-molded parts having an embedded conductive layer. Furthermore, there is a need for a method of making compression-molded parts having an embedded conductive layer.

Therefore, it is an object of the present invention to provide compression-molded parts having an embedded conductive layer.

It is a further object of the present invention to provide a method of making compression-molded parts having an embedded conductive layer.

A compression-molded part has a conductive layer embedded in the part during molding of the part. The conductive layer is generally adjacent an outer surface of the part and is preferably formed from a mesh, a foil, a pulled screen, or multiple layers of conductive elements. The part is preferably optimized for use on the exterior of an aircraft for lightning-strike or EMI protection or for use as an antenna.

Methods for forming the panels of the invention include placing the conductive layer against a mold surface of a compression mold, then forming the compression-molded part with the conductive layer embedded in the part.

The present invention provides for several advantages, including: (1) providing a lightweight part having an embedded conductive layer, the layer providing lightning-strike or EMI protection capability or for use as an antenna; (2) providing a method for forming the parts of the invention; and (3) providing methods for inhibiting movement of the conductive layer during forming of the parts of the invention.

BRIEF DESCRIPTION OF THE DRAWINGS

For a more complete understanding of the present invention, including its features and advantages, reference is now made to the detailed description of the invention taken in conjunction with the accompanying drawings in which like numerals identify like parts, and in which.

DESCRIPTION OF THE PREFERRED EMBODIMENT

The present invention represents the discovery that molded parts capable of providing lightning-strike protection may be formed by compression molding parts having an embedded conductive layer. The present invention may also be used to provide a conductive surface as required for electro-static discharge applications, for antennas, or for protection from EMI (electromagnetic interference, also called RFI, or radio frequency interference).

Figure 1:
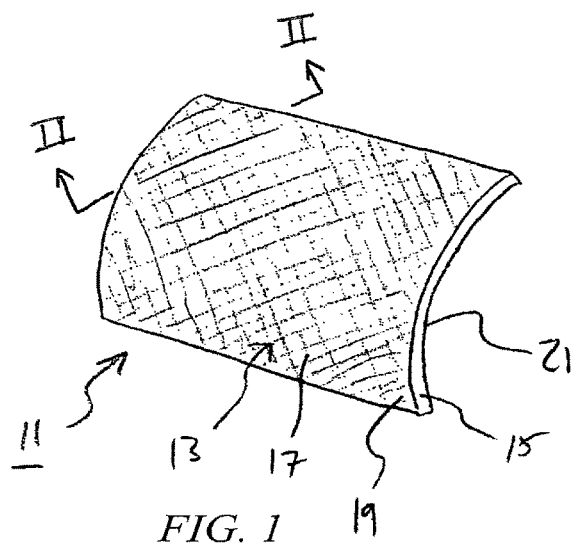
FIG. 1 is a perspective view of a compression-molded aircraft part according to the invention.

FIG. 1 shows a panel 11, which may be a panel forming a portion of the outer skin of an aircraft, having a conductive mesh 13 embedded in an outer portion of a member 15. Member 15 is compression molded from a curable molding material, such as a thermoset plastic, to form a preferably rigid material. Member 15 may be compression molded from composites, such as those containing glass or carbon fibers, including unidirectional tapes, woven fabrics, randomly orientated fiber mat, or chopped strand. The preferred embodiment is formed from sheets containing chopped fibers or from bulk material, which may be chopped fibers covered with resin. Member 15 is shown as a curved part, though member 15 may alternatively be formed as a planar or cup-shaped part.

Mesh 13 comprises multiple conductive elements 17, and these may be formed from any material having conductivity sufficient for use as an antenna or to conduct the current caused by a lightning strike. Conductive elements 17 formed from copper are particularly suited for use in mesh 13, although conductive elements 17 formed from aluminum or other metals may have mechanical, thermal, or electrochemical properties that may be advantageous in certain applications. Elements 17 may form a woven mesh, a foil, or a pulled screen, or one or more layers of individual conductive elements 17 may be used. Mesh 13 is embedded in member 15 generally adjacent outer surface 19, though mesh 13 may be located a small distance away from surface 19 as long as mesh 13 remains visible through surface 19. For example, it may be desirable for resin to cover mesh 13 to prevent damage or corrosion, though the lightning-strike effectiveness is reduced if fibers of the molding material cover mesh 13. Where desirable, an additional mesh 13 may be embedded in member 15 generally adjacent inner surface 21. Ends 22 of conductive elements 17 preferably extend to, or may protrude from, the edges of member 15, allowing mesh 13 to be conductively connected to mesh 13 of additional panels 11 or to metal structures for dissipation of electrical energy in mesh 13. Mesh 13 may alternatively be conductivity connected to additional panels 11 other structures through metal fasteners or inserts extending through panel 11 and in conductive contact with mesh 13.

Figure 2:
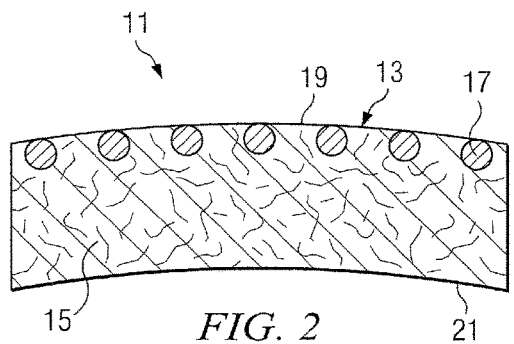
FIG. 2 is a cross-sectional side view of a portion of the molded aircraft part of FIG. 1 along the II-II line.

FIG. 2 is a cross-sectional view of panel 11 taken along the line II-II in FIG. 1. Member 15 has a cross-sectional thickness selected for the particular application, and this thickness does not determine the effectiveness of mesh 13 due to the positioning of mesh 13 at or near surface 19. Conductive elements 17 are shown as adjacent, or tangent to, outer surface 19, though elements 17 may be located a small distance away from outer surface 19, as described above.

Figure 3:
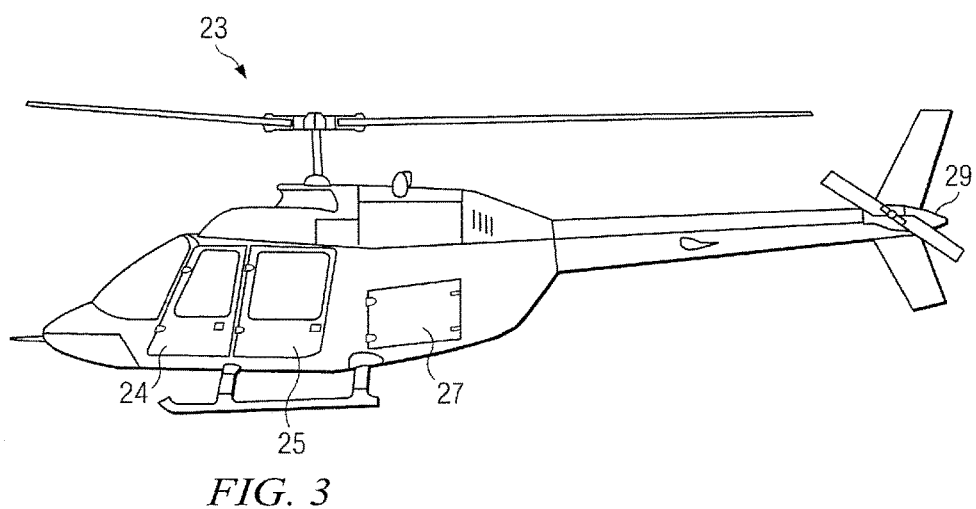
FIG. 3 is a side view of an aircraft having molded parts according to the invention.

FIG. 3 shows an aircraft, helicopter 23, having exterior panels according to the present invention in locations typical of where parts formed like panel 11 may be used. For example, doors 24, 25 may be formed according to the present invention as compression-molded parts having an embedded conductive layer, as may access panel 27 and tail fairing 29. Though not shown, other applications also include the fore and aft fairings on weapons pylons on military aircraft. Parts formed according to the present invention may be used on any appropriate outer surface, as long as the mechanical (e.g., aerodynamic, structural) loads and thermal conditions do not preclude their use.

If panel 11 is struck by a bolt of lightning or other electrical discharge, the electrical charge is conducted from the strike location by conductive elements 17, ends 22 (FIG. 1) of which are preferably conductively connected at the outer edges of panel 11 to adjacent panels 11 or to metal structures of the aircraft. As shown in FIG. 2, conductive elements 17 have a cross-sectional thickness, and this thickness will be selected, based on the material used to form elements 17 and on the number of elements 17 embedded in panel 11, to ensure sufficient capability to conduct the high current produced in a lightning strike. The same considerations would be used to select the appropriate mesh 13 for use as an antenna.

Figure 4:
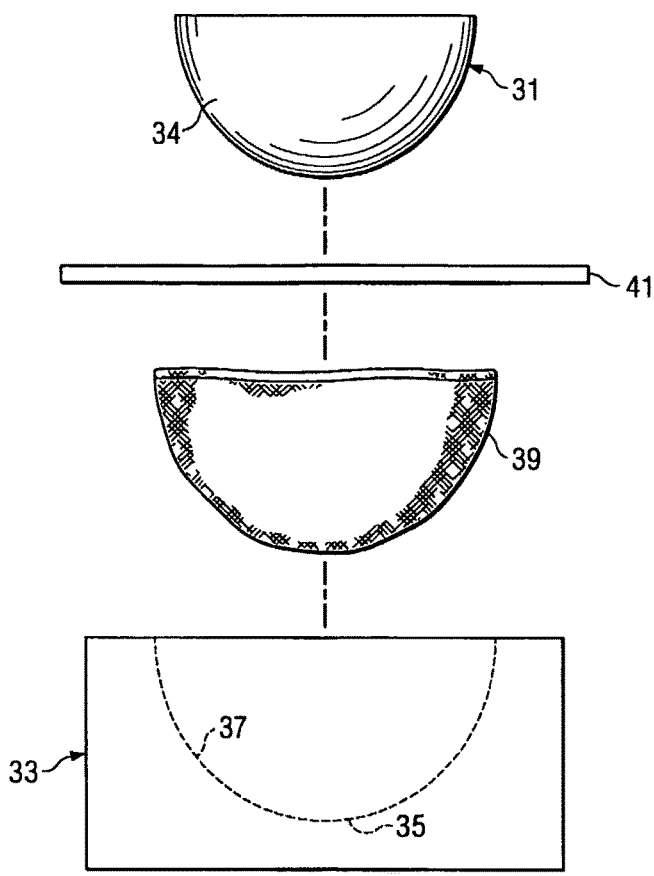
FIG. 4 is an exploded side view of the components used in the method according to the invention for forming molded parts according to the invention.

The present invention also provides for a method for forming compression-molded parts with an embedded conductive layer. FIG. 4 shows a mold comprising male die 31 and a matched female die 33. Male die 31 has an outer mold surface 34. Female die 33 has a mold cavity 35 shaped for receiving male die 31, and cavity 35 has an inner mold surface 37. Though shown as spherical, mold cavity 35 may be formed to have any appropriate shape required for the finished part. A conductive mesh 39, which is constructed like mesh 13 of FIG. 1, may be provided as a preform, as shown, having the general shape of mold cavity 35. Alternatively, mesh 39 may be provided in any appropriate form, such as multiple pieces, which is described below. In the figure, a sheet 41 of partially-cured, resin-coated fibers is provided, though bulk material may alternatively be used.

Figure 5:
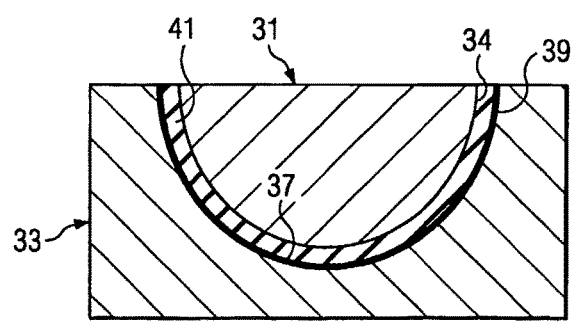
FIG. 5 is a cross-sectional view of the components of FIG. 4 assembled.

To form the part, mesh 39 is inserted into mold cavity 35 and pressed against inner surface 37 to conform mesh 39 to the shape and contours of inner surface 37. A sheet 41 of molding material is then placed in mold cavity 35 adjacent mesh 39, and male die 31 is inserted into female die 33. Insertion of male die 31 compresses sheet 41 against mesh 39 and conforms sheet 41 to outer surface 34 and to inner surface 37. This configuration is illustrated in FIG. 5, with male die 31 shown as fully pressed into female die 33 and compressing sheet 41 and mesh 39 in the space between outer surface 34 and inner surface 37. Resin within sheet 41 flows around the conductive elements of mesh 39. Pressure forcing dies 31, 33 together may be maintained, and the mold is heated to cure the resin in sheet 41. After curing, male die 31 is withdrawn from mold cavity 35, and the finished part is then removed from cavity 35.

Figure 6:
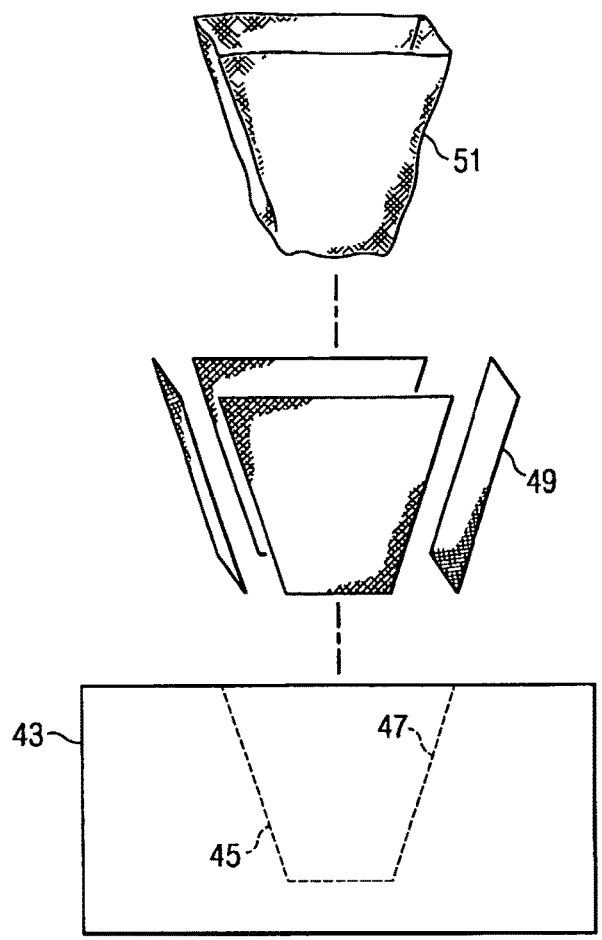
FIG. 6 is an exploded side view of the components used in an alternate method according to the invention for forming molded parts according to the invention.

FIG. 6 shows an alternate method according to the invention for forming the compression-molded parts of the invention. A mold comprises a female die 43 and a matched male die (not shown). Female die 43 comprises a mold cavity 45 having an inner surface 47 shaped for receiving the male die. In the method shown, conductive mesh 49 is shown as being formed of multiple pieces, rather than being a preform, that are inserted into mold cavity 45 and pressed against inner surface 47. The edges of the pieces of mesh 49 are overlapped to ensure a conductive path exists between the pieces of mesh 49.

In addition, FIG. 6 shows a method of preventing or limiting movement of mesh 49 within mold cavity 45 prior to curing of the molding material. To assist in preventing mesh 49 from moving from the desired position on inner surface 47 as the male die is pressed into female die 43, a nonconductive layer, such as fiberglass mat 51, is placed against the inside of mesh 49. Fiberglass mat 51 may be formed as a preform, as shown, or may be inserted as multiple pieces. The male die is then used to compress the molding material in mold cavity 45, and resin within the molding material flows into fiberglass mat 51 and mesh 49. The mold may then be heated to cure the resin, and the finished part is removed from mold cavity 45 after curing.

Figure 7:
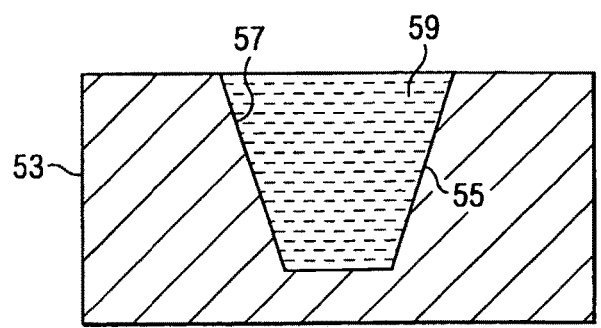
FIG. 7 is a cross-sectional view of a female die for use in a second alternate method according to the invention for forming molded parts according to the invention.

FIG. 7 illustrates an additional method of preventing movement of the conductive mesh within a mold. A female die 53 is shown, die 53 having a mold cavity 55. Inner surface 57 of mold cavity 55 has stippling 59, or a similar raised-surface finish, for preventing or limiting the sliding of the conductive mesh along inner surface 57 as the male die is inserted. Stippling 59 may be used with or without the fiberglass mat of the method shown in FIG. 6 and described above. The use of stippling or other non-smooth surface finish in the mold may be precluded if the outer surface of the finished part is required to be smooth, such as may be required on aerodynamic surfaces.

Though the methods of the invention are shown with the conductive layer being located adjacent the mold surface of the female die, the conductive layer may alternatively be located adjacent the mold surface of the male die. For example, this method may be used when forming bent or concave panels for the exterior of an aircraft.

The present invention provides for several advantages, including: (1) providing a lightweight part having an embedded conductive layer, the layer providing lightning-strike or EMI protection capability or for use as an antenna; (2) providing a method for forming the parts of the invention; and (3) providing methods for inhibiting movement of the conductive layer during forming of the parts of the invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description.

The invention claimed is:

1. A surface panel for an aircraft, the panel comprising:
   a compression-molded member composed of chopped fibers, having;
   an inner surface;
   an outer surface; and
   a plurality of edges connecting the inner surface to the outer surface;
   a conductive layer embedded within the entire member during molding of the member, the conductive layer having a conductivity for conducting a current caused by a lightning strike, the conductive layer located across the entire member and the conductive layer having ends protruding from all of the plurality of edges connecting the inner surface to the outer surface of the member, the conductive layer having a plurality of conductive elements selectively arranged in a mesh formation, wherein the mesh formation is adjacent with the outer surface of the member; and
   an electrical ending conductively coupled directly to the ends of the conductive layer protruding from all of the plurality of edges connecting the inner surface to the outer surface of the member, the electrical ending having a conductivity for conducting the lightning strike current, and the electrical ending being adapted to channel the lightning strike current from the conductive layer to a metal structure of the aircraft;
   wherein the conductive layer is co-extensive with the member.

2. The surface panel according to claim 1, wherein the compression molded member is at least partially formed from a thermoset plastic.

3. The surface panel according to claim 1, wherein the conductive layer is formed from a metallic material.

4. The surface panel according to claim 1, wherein the conductive layer is at least partially formed from copper.

5. The surface panel according to claim 1, wherein the conductive layer is at least partially formed from aluminum.

6. The surface panel according to claim 1, wherein the conductive layer is formed from multiple layers of conductive elements.

7. The surface panel according to claim 1, wherein the compression molded member is at least partially formed from a fiber-reinforced plastic.

* * * * *